United States Patent
Lee et al.

(10) Patent No.: US 9,013,990 B2
(45) Date of Patent: Apr. 21, 2015

(54) COMMUNICATION APPARATUS AND METHOD OF CONTENT ROUTER TO CONTROL TRAFFIC TRANSMISSION RATE IN CONTENT-CENTRIC NETWORK (CCN), AND CONTENT ROUTER

(75) Inventors: Ji Hoon Lee, Anyang-si (KR); Jae Hoon Kim, Yongin-si (KR); Byoung Joon Lee, Seongnam-si (KR); Myeong Wuk Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 13/586,463

(22) Filed: Aug. 15, 2012

(65) Prior Publication Data

US 2013/0182568 A1  Jul. 18, 2013

(30) Foreign Application Priority Data

Jan. 12, 2012 (KR) .................. 10-2012-0003893

(51) Int. Cl.
| | |
|---|---|
| H04L 12/26 | (2006.01) |
| H04L 12/833 | (2013.01) |
| H04L 12/801 | (2013.01) |
| H04L 12/835 | (2013.01) |
| H04L 12/823 | (2013.01) |
| H04L 29/08 | (2006.01) |

(52) U.S. Cl.
CPC .............. *H04L 47/31* (2013.01); *H04L 47/127* (2013.01); *H04L 47/30* (2013.01); *H04L 47/32* (2013.01); *H04L 67/327* (2013.01)

(58) Field of Classification Search
None
See application file for complete search history.

(56) References Cited

U.S. PATENT DOCUMENTS

| | | | |
|---|---|---|---|
| 2005/0188109 A1* | 8/2005 | Shiga et al. .................... | 709/239 |
| 2009/0287835 A1 | 11/2009 | Jacobson | |
| 2009/0288163 A1 | 11/2009 | Jacobson et al. | |
| 2010/0195655 A1* | 8/2010 | Jacobson et al. .............. | 370/392 |
| 2010/0274872 A1* | 10/2010 | Harrang et al. ............... | 709/217 |
| 2011/0170410 A1* | 7/2011 | Zhao et al. ..................... | 370/232 |
| 2011/0299389 A1 | 12/2011 | Mau et al. | |
| 2012/0120801 A1* | 5/2012 | Ramakrishnan et al. ..... | 370/235 |

FOREIGN PATENT DOCUMENTS

KR  10-2011-0039065 A  4/2011

OTHER PUBLICATIONS

Rangwala, Sumit, et al. "Neighborhood-Centric Congestion Control for Multihop Wireless Mesh Networks", IEEE/ACM Transaction on Networking, vol. 19, No. 6, Dec. 2011 (14 pages, in English).*

(Continued)

*Primary Examiner* — Chi H Pham
*Assistant Examiner* — Fahmida Chowdhury
(74) *Attorney, Agent, or Firm* — NSIP Law (57) ABSTRACT

A communication apparatus and method of a content router control a traffic transmission rate in a content-centric network (CCN), and the content router. In the communication method and the content router, a congestion of a network may be predicted, a warning signal indicating the congestion may be added to an interest packet, and the interest packet with the warning signal may be transmitted. Additionally, a traffic transmission rate may be controlled by adjusting a data packet transmission time based on a value of a marked field of a PIT. The PIT is set by receiving an interest packet to which a warning signal is added. Thus, the communication apparatus and method thereof provide reachability, while maintaining stability of network routing.

19 Claims, 7 Drawing Sheets

(56) References Cited

OTHER PUBLICATIONS

Extended European Search Report issued Mar. 28, 2013 in counterpart European Application No. 13151058.8-1862 (10 pages, in English).

Rangwala, Sumit, et al. "Neighborhood—Centric Congestion Control for Multihop Wireless Mesh Networks", IEEE/ACM Transaction on Networking, vol. 19, No. 6, Dec. 2011 (14 pages, in English).

* cited by examiner

Occurrence of congestion

| PIT 600 | | | |
|---|---|---|---|
| Name | Incoming face(s) | Marked | Lifetime |
| /s.com/image/a.gif/v1/s3 | 1 | 1 | |
| /cnn.com/videos/economy/today.mpg/v3/s2 | 1 | 1 | |
| | 2 | 0 | |
| | 3 | 0 | |
| /n.com/image/p.gif/v2/s4 | 2 | 0 | |

FIG. 7

COMMUNICATION APPARATUS AND METHOD OF CONTENT ROUTER TO CONTROL TRAFFIC TRANSMISSION RATE IN CONTENT-CENTRIC NETWORK (CCN), AND CONTENT ROUTER

CROSS-REFERENCE TO RELATED APPLICATION(S)

This application claims the benefit under 35 U.S.C. §119 (a) of Korean Patent Application No. 10-2012-0003893, field on Jan. 12, 2012, in the Korean Intellectual Property Office, the entire disclosure of which is incorporated herein by reference for all purposes.

BACKGROUND

1. Field

The following description relates to a communication apparatus and method of a content router to control a traffic transmission rate in a Content-Centric Network (CCN), and to the content router.

2. Description of Related Art

A Content-Centric Network (CCN) has two types of transmission structures, for example, an interest packet and a data packet. For example, a user may transmit the interest packet as a control packet, in which a name of a desired content is set as a destination. In this example, a network device with a CCN engine receives the interest packet, and searches for a routing table with the name of the desired content as an identifier. Additionally, the network device determines existence or nonexistence of a routing entry matching the name of the desired content included in the interest packet.

For example, when a corresponding content is stored in a predetermined node or a content router receives an interest packet through a content router in a CCN, a data packet is transferred in a route reverse to a route through which the interest packet passes. In this example, a content file requested by the interest packet is segmented and stored based on transmitter. Each interest packet includes a corresponding segment number and transmission information of a predetermined segment of a desired content.

However, traffic control is absent in a protocol of the CCN to avoid congestion occurring in a predetermined content router due to traffic concentration.

SUMMARY

In accordance with an illustrative example, there is provided a communication method to control a traffic transmission rate in a content-centric network (CCN) in which a content router transmits an interest packet. The communication method includes generating a warning signal indicating traffic congestion occurring in the content router, and adding the warning signal to an interest packet received from a previous node. The communication method also includes transmitting to a next node the interest packet to which the warning signal is added.

The communication method further includes predicting whether the traffic congestion occurs based on a rate of utilization of a packet queue for the content router or a pending interest table (PIT) of the content router.

The communication method further includes receiving, from another node, another interest packet to which the warning signal is added, and inserting a marked field in a pending interest table (PIT) of the content router, the marked field indicating whether the warning signal is added to the interest packet.

The communication method further includes setting a value of the marked field corresponding to an entry associated with a route, through which the interest packet added to the warning signal is received.

The communication method further includes determining whether entry corresponding to a route, through which the interest packet to added to the warning signal is received, is included in a pending interest table (PIT) of the content router.

The communication method further includes receiving a data packet responding to the interest packet, verifying a value of a marked field corresponding to an entry associated with the data packet, in a pending interest table (PIT) of the content router, and adjusting a data packet transmission time that the data packet is transmitted, based on the verified value of the marked field, to control the traffic transmission rate.

The controlling of the traffic transmission rate comprises delaying the data packet transmission time by a predetermined amount of time, based on the verified value of the marked field.

The communication method further includes calculating the predetermined amount of time, based on a backoff time (BT) window indicating a range of a window that the data packet transmission time is delayed, and based on an average processing time for the interest packet and the data packet.

The communication method further includes transmitting the data packet without a delay in the data packet transmission time, when the marked field has a first logical value.

The communication method further includes predicting an occurrence of traffic congestion when an average queue occupancy level of a packet queue or an occupancy level of a pending interest table (PIT) exceeds a predetermined threshold, and monitoring a rate of utilization of a packet queue for the content router or the PIT for the content router.

The communication method further includes configuring the warning signal to comprise an effect of requesting adjustment of an incoming rate of a received data packet.

A non-transitory computer readable recording medium storing a program to cause a computer to implement the communication method described above.

In accordance with an illustrative example, there is provided a content router to control a traffic transmission rate. The content router includes a processor configured to add a warning signal to an interest packet, based on a likelihood of traffic congestion occurring in the content router. The interest packet is received from a previous node. The content router also includes a memory configured to store a Pending Interest Table (PIT) for an interest packet passing through the content router. The content router includes a communication interface configured to enable a communication to be performed between the previous node, the content router, and a next node. The PIT comprises a marked field indicating whether the warning signal is added to the interest packet.

The processor determines, based on the PIT, whether the warning signal is added to the interest packet corresponding to the data packet received from another node, and adjusts a data packet transmission time that the data packet is transmitted.

The communication interface receives a data packet responding to the interest packet. The processor verifies a value of a marked field corresponding to an entry associated with the data packet in the PIT of the content router, delays the data packet transmission time by a predetermined amount of time based on the verified value of the marked field, and controls the traffic transmission rate.

The processor calculates the predetermined amount of time, based on a backoff time (BT) window, which indicates a range of a window in which the data packet transmission time is delayed, and based on an average processing time for the interest packet and the data packet.

The processor is further configured to predicting an occurrence of traffic congestion when an average queue occupancy level of a packet queue or an occupancy level of a pending interest table (PIT) exceeds a predetermined threshold, and monitor a rate of utilization of a packet queue for the content router or the PIT for the content router.

The warning signal comprises an effect of requesting adjustment of an incoming rate of a received data packet.

In accordance with another illustrative example, there is provided a method of a counter router to control a traffic transmission rate. The method includes receiving a data packet responding to an interest packet, and verifying a value of a marked field to control a traffic transmission rate by adjusting a data packet transmission time in which the data packet is transmitted, wherein the marked field corresponds to an entry associated with the data packet in a pending interest table (PIT) of the content router. The method also includes determining whether the marked field has a first logical value or a second logical value. When the marked field is determined to have the second logical value, the method includes calculating an amount of time based on a backoff time (BT) window indicating a range of a window in which the data packet transmission time is delayed, and based on an average processing time for the interest packet and the data packet, and controlling the traffic transmission rate by delaying the data packet transmission time by the amount of time. When the marked field is determined to have the first logical value, the method includes transmitting the data packet without a delay in the data packet transmission time.

In accordance with another illustrative example, there is provided a non-transitory computer readable recording medium storing a program to cause a computer to implement the method described above.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
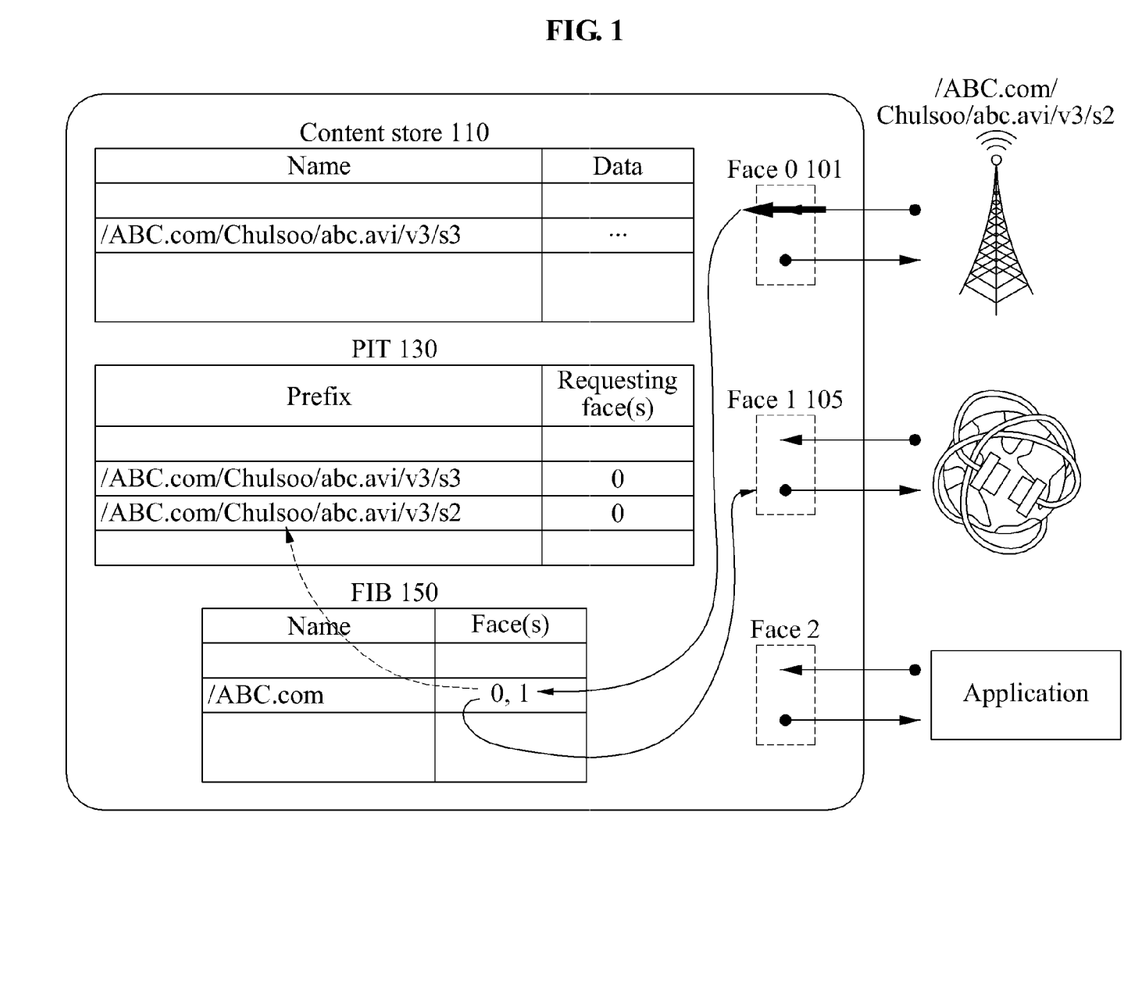
FIG. 1 is a diagram illustrating an example of an operation to process an interest packet requesting a content in a general Content-Centric Network (CCN).

FIG. 1 illustrates an example of an operation to process an interest packet requesting a content in a general Content-Centric Network (CCN).

In the CCN, a name of a content may function as a compass to search for a node in which the content is stored. The name of the content may also distinguish the content from another content. Accordingly, each of contents may use an identifying name. In one example, the names of two contents may be different from each other to distinguish the two contents to be different contents. The information included in these two contents, however, may be the same information. For example, when two files contain the same information, but have different names, namely '/ABC.com/sait/video/intro.avi,' and '/ABC.com/sait/comm/video/intro.avi,' the two files may be processed as being different contents. The above configuration may be useful in distinguishing different contents with similar names.

FIG. 1 illustrates an operation of processing an interest packet requesting a content in a CCN, for example a name-based network, to describe an operation of fetching a content based on a hierarchical name of the content.

For example, referring to FIG. 1, a node included in the CCN receives, from face 0 101, an interest packet that requests a content corresponding to a hierarchical name of the content, for example, '/ABC.com/Chulsoo/abc.avi/v3/s2.' The interest packet may include the hierarchical name of the content.

In this example, based on '/ABC.com/Chulsoo/abc.avi/v3/s2,' a networking module of the node determines whether the requested content is included in a content store 110 of the node.' ' When the content is determined to be stored in the content store 110, the node returns the content to face 0 101 from which the interest packet is received. In accordance with an illustrative example, the term 'face' may be used interchangeably with an 'interface.'

Figure 2:
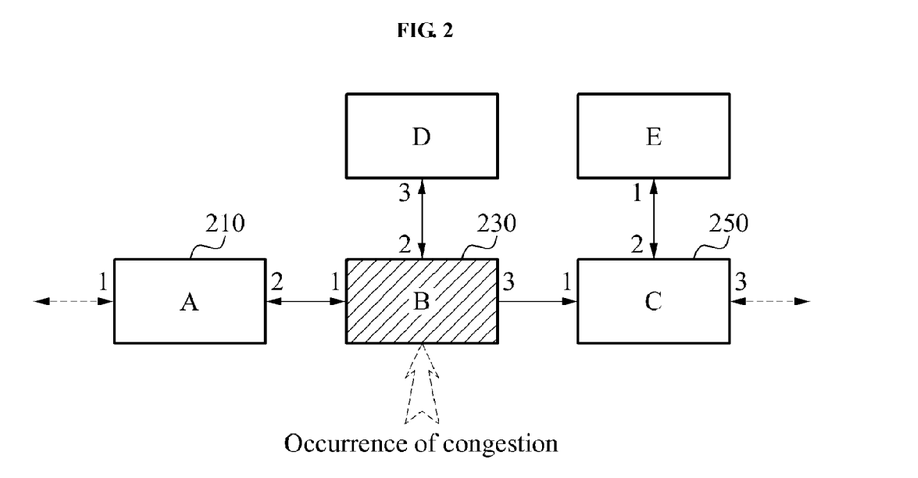
FIG. 2 is a diagram illustrating an example of an operation performed between content routers to control a traffic transmission rate in a CCN.

In another example, when the content is determined not to be stored in the content store 110, the node determines whether an entry stored with '/ABC.com/Chulsoo/abc.avi/v3/s2' is included in a Pending Interest Table (PIT) 130. When the entry is determined to be included in the PIT 130, the node adds information associated with face 0 101 to the entry in the PIT 130. When the entry is determined not to be included in the PIT 130, the node searches for the entry by performing a lookup based on the content name in a Forwarding Information Base (FIB) 150. In one example, the node searches for the entry based on longest-prefix-matching. Subsequently, the node selects face 1 105, to which the interest packet is to be transferred, based on information registered in the FIB 150. The node transmits the interest packet to the selected face 1 105. In this example, the node may register in the PIT 130, information '0' regarding face 0 101 to enable a data packet, which includes a content corresponding to the interest packet, to be transferred to a node requesting the content. Additionally, one of faces, other than face 0 101, may be selected based on the FIB 150 as a face to which the interest packet is to be transferred. FIG. 2 illustrates an example of an operation performed between content routers to control a traffic transmission rate in a CCN. A data packet transmitted in the CCN has a much larger size than an interest packet transmitted in the CCN. Accordingly, the traffic transmission rate may be controlled by controlling an incoming rate of a data packet flowing in a content router experiencing congestion. Hereinafter, a basic operation by which a content router controls a traffic transmission rate in a CCN will be described. In one example, the counter router is an object routing engine integrated into our object storage platform that intelligently and securely automates the distribution of data between clusters and can facilitate specialized operations within a cluster. The counter router leverages user-defined metadata per object to enable sophisticated content distribution, content processing and data protection policies based on your business requirements.

Referring to FIG. 2, each of content routers, for example a content router A 210, a content router B 230, a content router C 250, and other similar or alternative routers, may continue to monitor a rate of utilization of either a packet queue or a PIT for each of the content routers. Also, each of the content routers may determine whether congestion occurs.

The content router B 230 receives an interest packet through an incoming face 1 from the content router A 210, for instance, a previous node. When a content requested by the received interest packet is stored in a content store of the content router B 230, the content router B 230 may transmit the requested content using a data packet. Conversely, when the content is not stored in the content store of the content router B 230, the content router B 230 may transmit the interest packet to the content router C 250, for example a next node, through an outgoing face 3.

In the following description, it is assumed that a content requested by an interest packet is not stored in a content store of each of the content routers. In addition, it is also assumed that congestion is predicted to occur in the content router B 230. For example, the content router B 230 recognizes that the occurrence of the congestion is predicted. As a result, the counter router B 230 may include a warning signal, which indicates that the congestion is predicted to occur in the content router B 230. The warning signal would be included in an interest packet that is received at the content router B from the content router A 210 and that is forwarded through the content router B 230. Subsequently, the content router B 230 may transfer, to the content router C 250, for instance, the next node, the interest packet to which the warning signal is added. A scheme by which a content router transmits an interest packet to which a warning signal is added will be further described with reference to FIG. 3.

Figure 3:
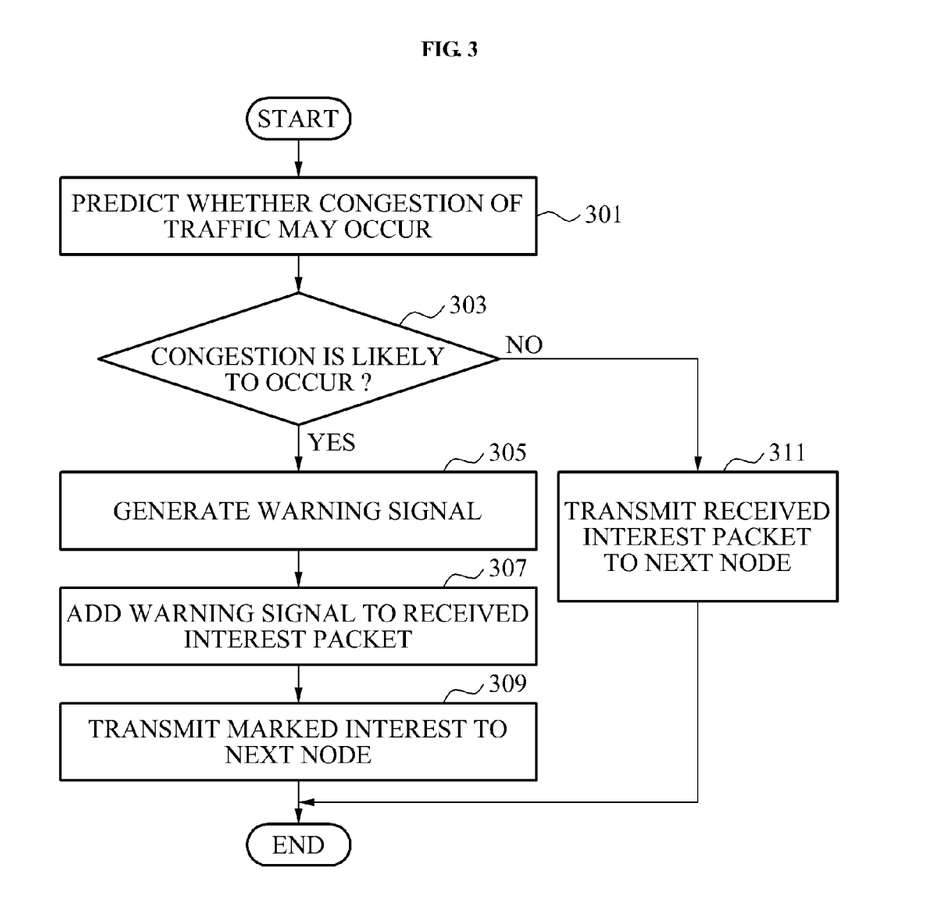
FIG. 3 is a flowchart illustrating an example of a process in which a content router transmits an interest packet including a warning signal to control a traffic transmission rate in a CCN.

FIG. 3 illustrates an example of a process in which a content router transmits an interest packet including a warning signal to control a traffic transmission rate in a CCN.

Referring to FIG. 3, in 301, the process performed at the content router predicts whether congestion of traffic may occur in the content router. To monitor a network state, the process of the content router may continue to monitor a rate of utilization of either a packet queue for the content router or a PIT for the content router. The process of counter router may also predict whether the congestion of the traffic may occur. For example, when an average queue occupancy level of the packet queue or an occupancy level of the PIT exceeds a predetermined threshold, the process of the content router predicts that the congestion may occur soon.

The content router predicts a smoothing rate in a current point in time, as shown in Equation 1 below. In this instance, 'smoothing' may refer to an operation performed by a content router to solve congestion, and a 'smoothing rate' may indicate how fast 'smoothing' is performed.

$$SR(t)=CR(t)-\alpha \times SR(t-1)$$ [Equation 1]

In Equation 1, SR(t) denotes a current smoothing rate, CR(t) denotes an incoming traffic rate in a current point in time, and SR(t−1) denotes a smoothing rate in a previous round. Additionally, α denotes a smoothing coefficient, and may have a value between '0' and '1'.

Based on a prediction result output in 301, in 303, the process of the content router determines the likelihood that the congestion would occur. For example, when SR(t) in Equation 1 exceeds a predetermined threshold, the content router may infer that the congestion may occur. For example, when SR(t) is measured to be 35 megabits per second (Mbps), and when a threshold is set to 30 Mbps, occurrence of the congestion may be inferred.

In an example in which the congestion is determined to likely occur in 303, in 305, the process of the content router generates a warning signal indicating the congestion. In 307, the process of the counter router adds the warning signal to an interest packet, which is received from a previous node and which is forwarded through the content router.

The process of content router may add the warning signal to the interest packet. The interest packet to which the warning signal is added may be referred to as a 'marked interest.' The marked interest may have an effect of requesting adjustment of an incoming rate of a received data packet, because the congestion is likely to occur in the content router.

In 309, the process of the content router transmits the marked interest to a next node. In another example in which the congestion is determined to be unlikely to occur in 303, the process of the content router transmits the received interest packet to the next node in 311.

Hereinafter, an example of an operation by which another content router receives the marked interest will be described with reference to FIG. 4.

Figure 4:
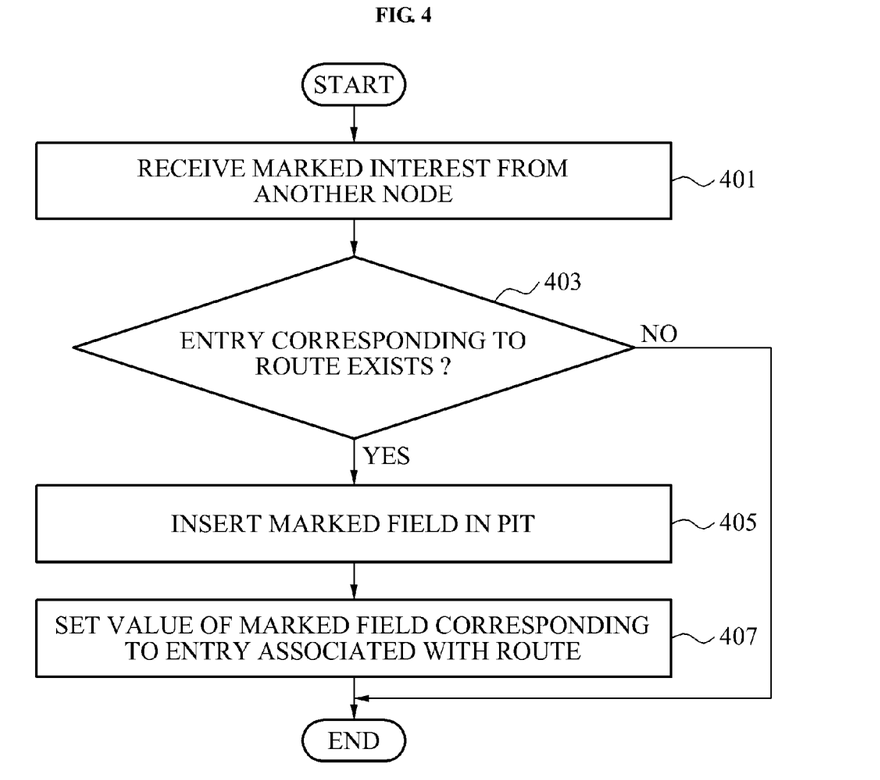
FIG. 4 is a flowchart illustrating an example of a process in which a content router sets a value of a marked field in a PIT when receiving an interest packet including a warning signal.

FIG. 4 illustrates an example of a process in which a content router sets a value of a marked field in a PIT when a marked interest is received at the content router.

Referring to FIG. 4, in 401, the process performed at the content router receives, from another node, an interest packet to which a warning signal is added, that is, a marked interest.

In 403, the process of the content router determines whether at least one entry corresponding to a route, through which the marked interest is received, is included in a PIT for the content router. As an example in which the at least one entry is determined to be included in the PIT, in 405, the process of the content router inserts in the PIT a marked field indicating whether the warning signal is added to the interest packet.

In 407, the process of the content router sets a value of the marked field corresponding to at least one entry associated with the route. The route may refer to a face or an interface through which an interest packet or a data packet is transmitted.

Content routers that receive a marked interest through the above-described operations may include a process that sets a value of a marked field corresponding to all entries in a PIT, which is associated with an incoming face, through which an interest packet is transferred. An example of a structure of a PIT in which a value of a marked field is set will be described below with reference to FIG. 6.

For example, referring to FIG. 2, the content router B 230 is assumed to predict that congestion occurs in the content router B 230. In this example, to notify the congestion, the content router B 230 adds a warning signal to an interest packet that is forwarded to neighboring content routers. The content router B 230 also transfers the interest packet to which the warning signal is added. Subsequently, the content router C 250 determines, among received interest packets, that the warning signal is added to an interest packet flowing in the content router C 250 through the face 1 associated with the content router B 230.

Additionally, the content router C 250 inserts a marked field in a PIT for the content router C 250. The marked field may indicate whether the warning signal is added to the interest packet.

The content router C 250 sets a value of the marked field corresponding to at least one entry associated with a route, through which the interest packet with the warning signal is received. In one example, when the value of the marked field is set, the content router C 250 does not perform an additional operation, despite the receipt of warning signals via the same route during a predetermined period of time.

Figure 5:
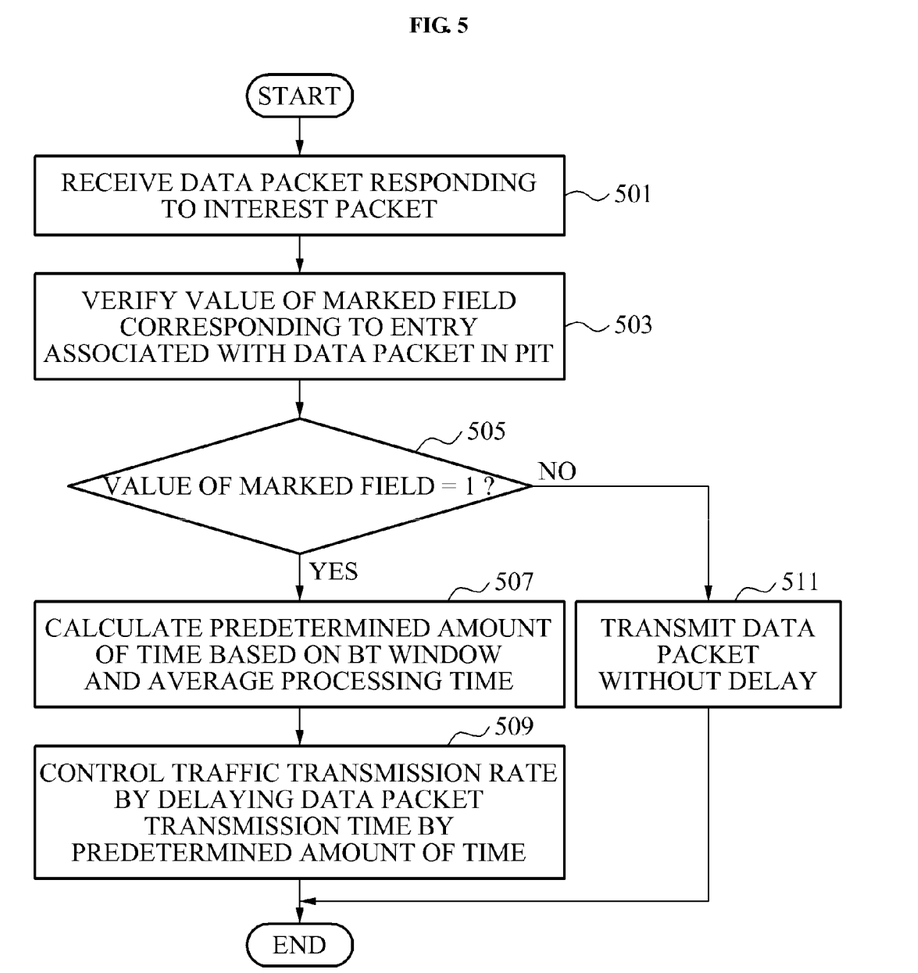
FIG. 5 is a flowchart illustrating an example of a process in which a content router controls a traffic transmission rate based on a value of a marked field.

FIG. 5 illustrates an example of a process in which a content router controls a traffic transmission rate based on a value of a marked field.

Referring to FIG. 5, in 501, a data packet responding to an interest packet is received. In 503, the process performed at the content router verifies a value of a marked field corresponding to an entry associated with the data packet in a PIT for the content router. In 503, based on the value of the marked field verified, the process of the content router controls a traffic transmission rate by adjusting a data packet transmission time in which the data packet is transmitted.

In 505, the process of the content router determines whether the marked field has a second logical value, for example a value of '1'. In an example in which the marked field is determined to have the second logical value, in 507, the process of the content router calculates a predetermined amount of time to be delayed, based on a Backoff Time (BT) window indicating a range of a window in which the data packet transmission time is delayed, and based on an average processing time for the interest packet and the data packet. For example, when a marked field has a value of '1', when a BT window has a length of 1, and when an average processing time of 0.5 ms is required, the predetermined amount of time may be calculated to be 0.5 ms.

In 509, based on the value of the marked field, the process of the content router controls a traffic transmission rate by delaying the data packet transmission time by the predetermined amount of time.

In another example of 505, in which the marked field is determined to have a first logical value, for example a value of '0', in 511, the process of the content router transmits the data packet without a delay in the data packet transmission time.

The above-described process will be described with reference to FIG. 2.

For example, the content router C 250 receives a plurality of data packets from neighboring content routers. While forwarding the received data packets, the content router C 250 determines whether an entry associated with each of the received data packets is included in a PIT for the content router C 250.

In this example, the determining of whether the entry is included in the PIT indicates whether at least one entry corresponding to a route, through which a marked interest is transferred, is included in the PIT. Subsequently, the content router C 250 verifies a value of a marked field corresponding to the entry. For example, when a value of a marked field corresponding to an entry associated with a data packet is set to '1', the content router may not immediately transmit the data packet.

When a forwarding latency time, which is delayed by adding a random delay value based on the set value of the marked field, elapses, the content router C 250 transmits a data packet to the content router B 230 that experiences congestion. The random delay value may be randomly selected from among values of the BT window, which will be described later. Accordingly, the content router C 250 may reduce a traffic incoming rate of the data packet flowing in the content router B 230.

The content router delays the data packet transmission time by selecting a random time from among values of the BT window, using the following Equation 2:

$$N = 2^c - 1 \quad \text{[Equation 2]}$$

In Equation 2, c denotes a number of data packets transmitted after a period in which congestion is marked in a marked field of a PIT for a content router, and N denotes a maximum value of the BT window.

For example, when a value of a marked field is set and when a data packet is continuously received, a delay in transmission of the data packet via a corresponding route, namely a face, may be increased with an exponential distribution. Accordingly, it is possible to avoid congestion by adjusting the data packet transmission time based on the value of the marked field. To prevent congestion from occurring in the content router B 230, the content router C 250 may delay a data packet transmission speed by a time of 'BT*D', and may control an incoming rate. In 'BT*D', 'BT' indicates a BT window. The BT window may be determined to be one of elements included in a set of 0 to N, where N is a natural number, from zero to any positive integer. Additionally, D denotes a forwarding latency, and refers to a time required by a content router to receive a packet via an incoming face and to forward the packet via an outgoing face. The forwarding latency D indicates an average processing time required to process each packet, for example, an interest packet and a data packet, within the content router.

For example, when a marked field corresponding to an entry associated with a data packet received by the content router C 250 has a value of '1' in a PIT, the content router C 250 randomly selects a time range from the BT window. Subsequently, the content router C 250 delays a data packet transmission time by the time of 'BT*D,' which is based on the BT window and the forwarding latency D, and transfers the data packet to the content router B 230.

As described above, it is possible to control a traffic transmission rate by adjusting a time in which a data packet is transmitted to a content router experiencing congestion. Thus, it is also possible to avoid congestion of a network.

Figure 6:
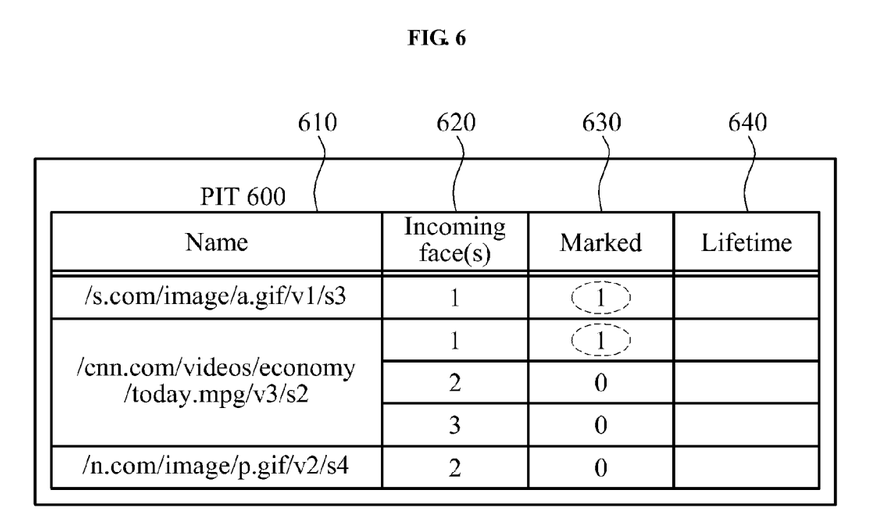
FIG. 6 is a diagram illustrating an example of a structure of a Pending Interest Table (PIT) changed by a content router to control a traffic transmission rate in a CCN.

FIG. 6 illustrates an example of a structure of a PIT changed by a content router to control a traffic transmission rate in a CCN.

Referring to FIG. 6, a PIT 600 for a content router in a CCN includes an entry field 610 stored with a content name, an incoming face field 620, for example, a route through which an interest packet corresponding to a corresponding entry is received, and a lifetime field 640 indicating a duration that a corresponding entry is to be stored. Additionally, the PIT 600 includes a marked field 630 indicating whether a warning signal is added to each of at least one interest packet.

The marked field 630 may be generated in correspondence to at least one entry associated with a route (such as a face) through which an interest packet is transferred. The interest packet includes a warning signal. For example, referring to FIGS. 2 and 6, when a value of the marked field 630 is set to '1,' the content router C 250 adjusts an incoming rate of a received data packet because congestion is predicted to occur in the content router B 230, which is in a route or a face through which an interest packet is received.

In this example, an interest packet with 's.com/image/a.gif/v1/s3' as a content name is assumed to be transmitted via the face 1. Also, a warning signal is assumed to be added to the interest packet.

The content router C 250 sets to '1,' a value of a marked field corresponding to an entry associated with the face 1 used to transfer the interest packet with 's.com/image/a.gif/v1/s3', despite that another interest packet with '/cnn.com/videos/economy/today.mpg/v3/s2' as a content name may be received. Because even different interest packets are transmitted through the same route, for example the face 1, a process of adjusting a data packet transmission time needs to be equally applied.

Figure 7:
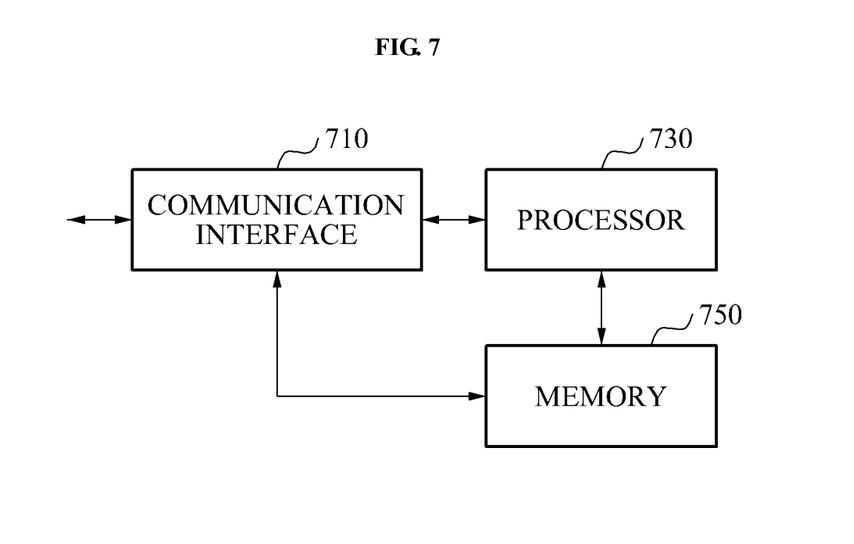
FIG. 7 is a block diagram illustrating an example of a content router configured to control a traffic transmission rate in a CCN.

FIG. 7 illustrates an example of a content router configured to control a traffic transmission rate in a CCN. The content router of FIG. 7 is configured to control a traffic transmission rate in a CCN that uses an interest packet, which includes a name of a content to transmit or receive a data packet corresponding to the content.

As illustrated in FIG. 7, the content router includes a communication interface 710, a processor 730, and a memory 750. The communication interface 710 enables communication to be performed between a previous node, a next node, and the content router. The communication interface 710 receives a data packet responding to an interest packet.

Based on whether congestion of traffic occurs in the content router, the processor 730 adds a warning signal to an interest packet received from the previous node. The warning signal indicates a congestion occurrence.

The processor 730 verifies a value of a marked field corresponding to an entry associated with the data packet in a PIT for the content router. The processor 730 also delays a data packet transmission time by a predetermined amount of time, based on the verified value of the marked field. The processor 730 further controls a traffic transmission rate. Additionally, the processor 730 determines, based on the PIT, whether the warning signal is added to an interest packet corresponding to a data packet received from another node. Based on a result of the determination performed, the processor 730 adjusts a data packet transmission time in which the data packet is transmitted.

Furthermore, based on a BT window and based on an average processing time for the interest packet and the data packet, the processor 730 calculates the predetermined amount of time. The BT window indicates a range of a window in which the data packet transmission time is delayed.

The memory 750 stores a PIT for at least one interest packet passing through the content router. The PIT may include a marked field indicating whether a warning signal is added to each of the at least one interest packet.

The processor 730 and the memory 750, each may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processor 730 and the memory 750, each may run an operating system (OS) and one or more software applications that run on the OS. The processing device also may access, store, manipulate, process, and create data in response to execution of the software. For purpose of simplicity, the description of the processor 730 and the memory 750, each is used as singular; however, one skilled in the art will appreciated that a processing device may include multiple processing elements and multiple types of processing elements. For example, the processor 730 and the memory 750, each may include multiple processors or a processor and a controller. In addition, different processing configurations are possible, such a parallel processors.

According to embodiments, a congestion of a network may be predicted, a warning signal indicating the congestion may be added to an interest packet, and the interest packet with the warning signal may be transmitted. Thus, it is possible to avoid network congestion and waste of network resources caused by a retransmission attempt due to a delay in transmission of a data packet and a packet loss that result from the congestion of the network.

Additionally, according to embodiments, a traffic transmission rate may be controlled, by adjusting a data packet transmission time based on a value of a marked field of a PIT set by receiving an interest packet to which a warning signal is added. Thus, it is possible to provide reachability, while maintaining stability of network routing.

The method according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

It is to be understood that in the embodiment of the present invention, the operations in FIGS. 3-5 are performed in the sequence and manner as shown although the order of some steps and the like may be changed without departing from the spirit and scope of the present invention. In accordance with an illustrative example, a computer program embodied on a non-transitory computer-readable medium may also be provided, encoding instructions to perform at least the method described in FIGS. 3-5.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method to control a traffic transmission rate in a content-centric network (CCN) in which a content router transmits an interest packet, the communication method comprising:
   predicting whether traffic congestion occurs in the content router based on a rate of utilization of a pending interest table (PIT) of the content router;
   generating a warning signal indicating the prediction of traffic congestion occurring in the content router;
   adding the warning signal to an interest packet received from a previous node; and
   transmitting to a next node the interest packet to which the warning signal is added.

2. The communication method of claim 1, further comprising:
   receiving, from another node, another interest packet to which the warning signal is added; and
   inserting a marked field in the PIT, the marked field indicating whether the warning signal is added to the interest packet.

3. The communication method of claim 2, further comprising:
   setting a value of the marked field corresponding to an entry associated with a route, through which the interest packet added to the warning signal is received.

4. The communication method of claim 1, further comprising:
   determining whether entry corresponding to a route, through which the interest packet to added to the warning signal is received, is included in the PIT.

5. The communication method of claim 1, further comprising:
   receiving a data packet responding to the interest packet;
   verifying a value of a marked field corresponding to an entry associated with the data packet, in the PIT; and
   adjusting a data packet transmission time that the data packet is transmitted, based on the verified value of the marked field, to control the traffic transmission rate.

6. The communication method of claim 5, wherein the controlling of the traffic transmission rate comprises delaying the data packet transmission time by a predetermined amount of time, based on the verified value of the marked field.

7. The communication method of claim 6, further comprising:
   calculating the predetermined amount of time, based on a backoff time (BT) window indicating a range of a window that the data packet transmission time is delayed, and based on an average processing time for the interest packet and the data packet.

8. The communication method of claim 6, further comprising:
   transmitting the data packet without a delay in the data packet transmission time, when the marked field has a first logical value.

9. The communications method of claim 1, further comprising:
   predicting an occurrence of traffic congestion in response to an average queue occupancy level of a packet queue or an occupancy level of the PIT exceeding a predetermined threshold; and
   monitoring a rate of utilization of a packet queue for the content router or the PIT for the content router.

10. The communications method of claim 1, further comprising:
    configuring the warning signal to comprise an effect of requesting adjustment of an incoming rate of a received data packet.

11. A non-transitory computer readable recording medium storing a program to cause a computer to implement the communications method of claim 1.

12. A content router to control a traffic transmission rate, the content router comprising:
    a processor configured to add a warning signal to an interest packet, based on a likelihood of traffic congestion occurring in the content router, wherein the interest packet is received from a previous node;
    a memory configured to store a pending interest table (PIT) for an interest packet passing through the content router; and
    a communication interface configured to enable a communication to be performed between the previous node, the content router, and a next node, wherein:
    the PIT comprises a marked field indicating whether the warning signal is added to the interest packet, and
    the processor predicts the likelihood of traffic congestion occurring in the content router based on a rate of utilization of the PIT.

13. The content router of claim 12, wherein the processor determines, based on the PIT, whether the warning signal is added to the interest packet corresponding to the data packet received from another node, and adjusts a data packet transmission time that the data packet is transmitted.

14. The content router of claim 12, wherein the communication interface receives a data packet responding to the interest packet, and
    wherein the processor verifies a value of a marked field corresponding to an entry associated with the data packet in the PIT of the content router, delays the data packet transmission time by a predetermined amount of time based on the verified value of the marked field, and controls the traffic transmission rate.

15. The content router of claim 14, wherein the processor calculates the predetermined amount of time, based on a backoff time (BT) window, which indicates a range of a window in which the data packet transmission time is delayed, and based on an average processing time for the interest packet and the data packet.

16. The content router of claim 12, wherein the processor is further configured to predict an occurrence of traffic congestion in response to an average queue occupancy level of a packet queue or an occupancy level of a pending interest table (PIT) exceeding a predetermined threshold, and monitor a rate of utilization of a packet queue for the content router or the PIT for the content router.

17. The content router of claim 12, wherein the warning signal comprises an effect of requesting adjustment of an incoming rate of a received data packet.

18. A method of a counter router to control a traffic transmission rate, the method comprising:
- receiving a data packet responding to an interest packet;
- verifying a value of a marked field to control a traffic transmission rate by adjusting a data packet transmission time in which the data packet is transmitted, wherein the marked field corresponds to an entry associated with the data packet in a pending interest table (PIT) of the content router;
- determining whether the marked field has a first logical value or a second logical value;
- in response to the marked field being determined to have the second logical value, calculating an amount of time based on a backoff time (BT) window indicating a range of a window in which the data packet transmission time is delayed, and based on an average processing time for the interest packet and the data packet, and
- controlling the traffic transmission rate by delaying the data packet transmission time by the amount of time;
- in response to the marked field being determined to have the first logical value, transmitting the data packet without a delay in the data packet transmission time; and
- predicting whether traffic congestion occurs in the content router based on a rate of utilization of a pending interest table (PIT) of the content router.

19. The method of claim 18, wherein the controlling the traffic transmission rate further comprises adjusting the data packet transmission time based on a value of the marked field of the PIT set by receiving the interest packet to which a warning signal is added.

* * * * *